United States Patent [19] [11] 3,781,703

Duty [45] Dec. 25, 1973

[54] ELECTRONIC AMPLIFIER WITH DUAL AUTOMATIC SLOPE CONTROL

[75] Inventor: George Otto Duty, Warminster, Pa.

[73] Assignee: Jerrold Electronics Corporation, Philadelphia, Pa.

[22] Filed: Oct. 6, 1972

[21] Appl. No.: 295,564

[52] U.S. Cl. .................... 330/52, 330/86, 330/132, 330/134, 330/145
[51] Int. Cl. .................... H03g 5/16
[58] Field of Search .................... 330/29, 52, 86, 132, 330/134, 137, 145; 333/18

[56] References Cited

UNITED STATES PATENTS

| | | | |
|---|---|---|---|
| 3,178,649 | 4/1965 | Thomas | 330/52 |
| 3,510,793 | 5/1970 | Barber | 330/52 |

FOREIGN PATENTS OR APPLICATIONS

| | | | |
|---|---|---|---|
| 951,058 | 3/1964 | Great Britain | 330/134 |

Primary Examiner—Roy Lake
Assistant Examiner—James B. Mullins
Attorney—Nichol M. Sandoe et al.

[57] ABSTRACT

An amplifier is characterized by electronically variable slopes ("tilt") at the bounds of its signal amplification gain-frequency passband characteristic. Separate feedback circuitry is responsive to an associated one of two frequency-spaced pilot signals for suitably adjusting the response properties of the amplifier. The pilot signals may be specially generated, or may comprise components of the signal operated upon by the amplifier - such as one high band and one low band video carrier for a CATV television signal distribution application.

1 Claim, 2 Drawing Figures

PATENTED DEC 25 1973 3,781,703

ELECTRONIC AMPLIFIER WITH DUAL AUTOMATIC SLOPE CONTROL

DISCLOSURE OF INVENTION

Figures 1, 2:
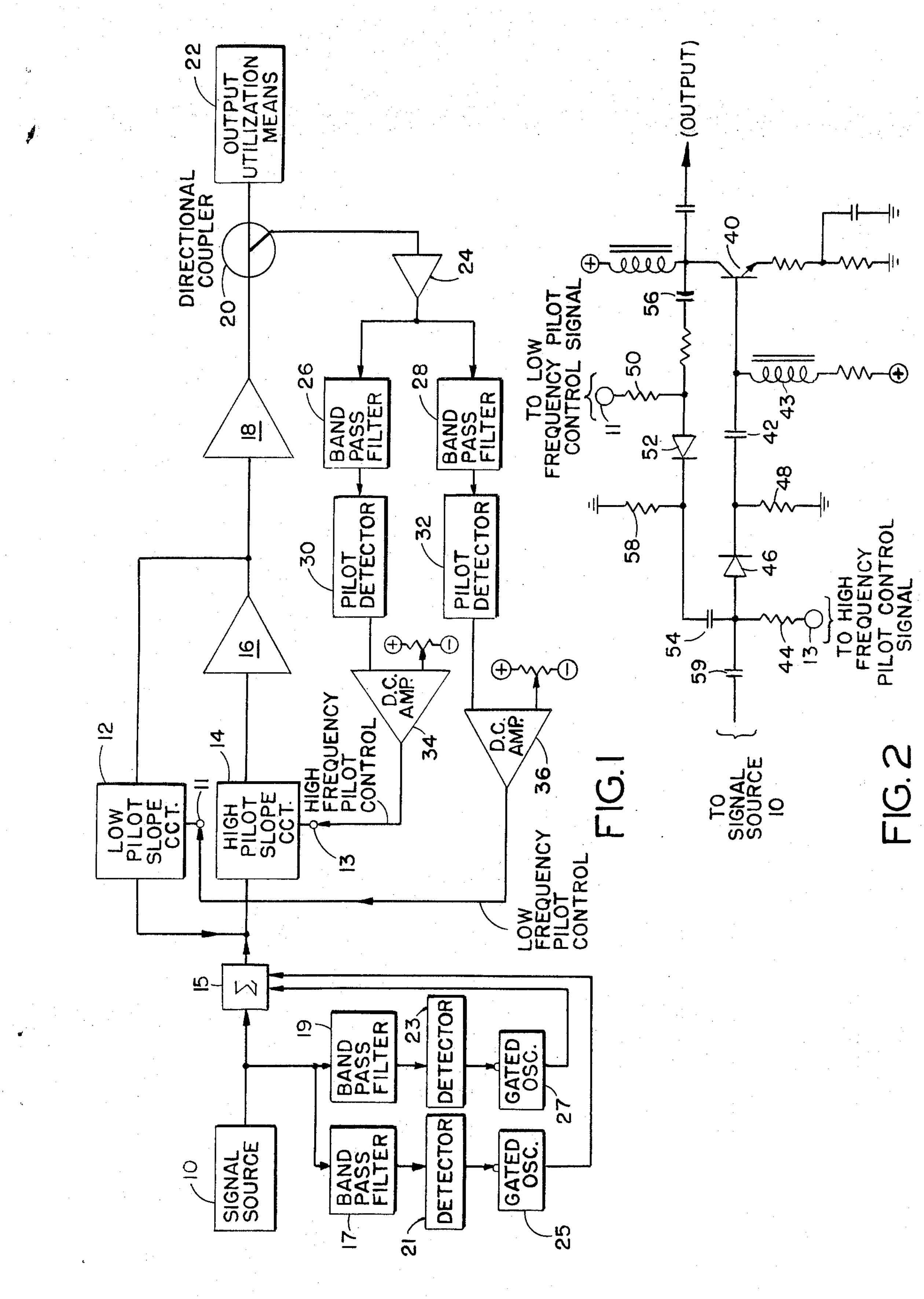

This invention relates to electronic amplifiers and, more specifically, to an amplifier circuit arrangement which separately and automatically adjusts the amplifier transfer characteristic for differing frequency ranges in the overall amplifier frequency passband.

Selected communications installations, e.g., community antennae television (CATV) systems, employ a network for distributing signals generated (or reproduced) at a common, head end location to diversely located system subscribers. Thus, in the CATV context, a reasonably complex antennae structure recovers commercially broadcast television signals and distributes these signals - and possibly also locally produced supplementary video programming or private communications services as well, to television receivers at subscriber location via a cable network.

The distribution cable topography will typically include lines of varying, sometimes relatively long lengths. Thus, to maintain signal strength within relatively narrow amplitude bounds throughout the network, physically spaced repeater amplifiers are cascaded within the network cables. The gain of each amplifier is ideally adjusted to offset the signal attenuation effected by the cable length from the preceding amplifier.

However, the attenuation characteristic of the network cables may differ for different signal frequencies, e.g., may differ between the low (channels 2–6) and high (channels 7–13) VHF television bands, and within these bands. Further, the attenuation properties of the cable vary as a general matter with changing environmental conditions, most importantly temperature.

It is thus an object of the present invention to provide an improved active signal distribution arrangement.

More specifically, an object of the present invention is the provision of a CATV signal distribution system including repeater line amplifiers having circuitry for automatically adjusting the form of the amplifier gain-frequency characteristic to compensate for frequency dependent gain variations otherwise obtaining in the system.

The above and other objects of the present invention are realized in a specific, illustrative CATV repeater line amplifier which includes electronically variable gain -vs- frequency slopes ("tilt") at the extremities of its amplification passband. The amplifier is supplied with an ensemble of video programs, the incident signals including control pilot signals near the end portions of the VHF television band. These pilots may be specially generated signals, or signals inherently present in the received programing such as the picture carriers for channels 4 and 11.

The slope, or tilt exhibited by the amplifier about the low portion of its passband is automatically adjusted and maintained by feedback action. More specifically, the low band pilot (e.g. the channel 4 video carrier) is monitored and detected at the amplifier output. The detected pilot amplitude is compared with a reference potential, as in a difference (or differential) amplifier, and the low frequency amplifier tilt property automatically adjusted by the output of the difference amplifier. Similar circuit functioning operable with respect to the high band pilot (such as the channel 11 video carrier) regulates the slope or tilt atop the high band portion of the amplifier transfer characteristic.

The above and other features and advantages of the present invention are realized in a specific illustrative embodiment thereof, described in detail hereinbelow in conjunction with the accompanying drawing, in which:

FIG. 1 is a block diagram of amplifier circuitry illustrating the principles of the present invention; and FIG. 2 depicts a specific circuit arrangement which may advantageously be employed in the FIG. 1 arrangement.

Referring now to FIG. 1, there is shown in block diagram form an illustrative line amplifier, as for a CATV signal distribution application. An ensemble of television programing signals is supplied to the amplifier by a source 10 thereof via a linear signal summing network 15. The signal source 10 (and the remaining elements shown to the left of element 14 in FIG. 1) may illustratively comprise conventional CATV head end equipment and a portion of the system signal distributing cable network, including cable runs and line amplifiers physically and electrically disposed between the subject amplifier of FIG. 1, and the head end common equipment.

The incoming television signals pass through amplifier gain-producing structure comprising a high pilot slope circuit 14 (i.e., circuitry exhibiting a fixed low frequency pivot point and a variable high frequency-gain characteristic), an amplifier 16, and a low pilot slope circuit 12 (high frequency pivot) connected in a negative feedback path about the amplifier 16. One specific circuit embodiment of the functional blocks 12, 14, 16 is illustrated in FIG. 2, and is described hereinbelow. In overall view, the slope circuit 14 adjusts the composite amplifier response tilt at the upper portion of the amplifier passband dependent upon the value of a direct current control signal applied at a slope circuit input control terminal 13. Similarly, the low pilot slope circuit 12 adjusts the low frequency portion of the amplifier passband gain characteristic dependent upon the value of a direct current control signal applied at a circuit control node 11.

For purposes of separately regulating the tilt or slope at the high and low frequency portions of the amplifier passband, the incident signal supplied by the source 10 includes pilot signals in these high and low frequency ranges. These pilot signals may comprise signals specially generated for this purpose or, alternatively, if available, components of the incident signal may be used for this purpose. Thus, with specific reference to the CATV context, the main carrier of one high VHF signal, e.g., the channel 11 carrier, may be used in conjunction with one low band carrier, e.g., that of channel 4.

The FIG. 1 amplifier is initially set up in service (or pre-adjusted) such that the television band output signals amplified by an amplifier 18 and passing through a directional coupler 20 to output utilization means 22 (e.g., further system cables, or, in rare instances, a subscriber station drop line) are maintained in their proper amplitude relationship at or near balance, and at a proper level. Thereafter, when the frequency attenuation properties of the cable change with aging or varying environmental conditions, the composite circuitry of FIG. 1 varies the amplifier tilt properties at one or both ends of the band to maintain the desired balanced signal condition, i.e., the FIG. 1 amplifier compensates the signal distribution system for frequency dependent spurious gain-attenuation perturbations.

To this end, examining first the high end tilt characteristic, a portion of the amplified signal leaving the amplifier 16 and a following amplifier 18 is passed by a directional coupler 20 and an amplifier 24 to a band pass filter 26 which passes only the high band pilot (for the assumed case, the channel 11 video carrier). The amplitude of this pilot is detected in a peak detector 30 (which thus senses carrier level during the sync tip interval), and is compared with a reference potential in a direct current difference amplifier 34, the output of which is supplied to the high pilot slope circuit control port 13. The above-described feedback control circuit acts to maintain the channel 11 pilot at a predetermined proper magnitude by suitably adjusting the high band gain-frequency tilt, either increasing or decreasing the response characteristic upper range slope as required.

Similarly, a band pass filter 28 passes only the low band pilot (e.g., the channel 4 video carrier) which is detected in an element 32 and compared with a reference potential in a direct current amplifier 36. The direct current output potential of the difference amplifier 36 is applied via the control port 11 to the low pilot slope circuit 12 adjusting the slope thereof such that the channel 4 carrier attains its predetermined amplitude. Thus, by maintaining the pilot signals in the mid portion of the upper and lower VHF bands at their proper amplitude, all video programming is maintained at or about proper signal strength independent of changing characteristics of the CATV distribution system.

The above discussion has assumed the continued existence of the high and low band video channels selected as tilt controlling pilots, e.g., channels 4 and 11. Such carriers may not be present in particular areas or, if normally present, may be lost through some failure of the broadcasting or receiving equipment.

To maintain the system operable notwithstanding loss of one or both of these incoming band pass filters 17 and 19 (illustratively, head end equipment) respectively extract the channel 4 and channel 11 main carriers which are separately amplitude detected in detectors 21 and 23. When the output of the detector 21 or 23 attains a low, sub-threshold potential value, signaling that one or both of the pilot carriers has been lost, an associated gated oscillator 25 or 27 (or both) is enabled. The oscillators 25 and 27 respectively supply sinusoids at the channel 4 and channel 11 carrier frequencies which are under these conditions introduced into the input of the FIG. 1 amplifier via the summing network 15. The substituted pilot signals are generated in a proper amplitude relationship with the incoming video signals such that tilt controlling pilots are present on the cable system at all times.

A particular circuit configuration for the elements 12, 14 and 16 of FIG. 1 is shown in FIG. 2, and comprises a transistor 40 as the principal active, gain producing element. The transistor 40 is shown as connected in a grounded emitter configuration to radio frequency signals with a collector load at the television frequency spectrum. Negative feedback is provided between the transistor collector and base terminals. The high pilot slope variation is effected by electrically adjusting the operating point of a diode 46 which has the characteristic of acting as a bias controlled variable resistor to radio frequency signals, while the low frequency amplifier slope is regulated by varying the resistance of a similar diode 52 in the amplifier feedback path.

As is well known, the resistance of a diode to small incremental signals decreases with increasing direct current bias applied to the diode. Thus, the resistance presented by the diode 46 to television band signals decreases with increasing potential supplied to the amplifier signal node 13, the diode biasing current flowing through resistors 44 and 48 and the diode 46. Similarly, the effective small signal resistance of the diode 52 is determined by the potential applied to the amplifier node 11 which determines the diode 52 biasing current in conjunction with the resistors 50 and 58. The signal nodes 11 and 13 in FIG. 2 correspond to the like numbered nodes in FIG. 1 with respect to the pilot slope circuits 12 and 14. It is further observed with respect to FIG. 2 that the direct current bias applied to the diodes 46 and 52 is completely isolated from the television high frequency alternating current signals by capacitors 54, 59 and 42 (with respect to diode 46); and by the capacitors 54 and 56 with respect to the diode 52.

The active resistance of the diode 46 interacts with the effective input impedance of the transistor 40, which is complex having both real and imaginary components at the upper end of the video band. Accordingly, the electrically adjusted resistance of the diode 46 coacts with the effective complex input impedance of the transistor 40 to produce the varying slope or tilt at the upper end of the composite amplifier passband characteristic. Similarly, the electrically controlled resistance of the diode 52 reacts with the associated reactive components associated therewith to control the amount of negative feedback at the low end of the amplifier frequency range, and to thereby vary the slope or tilt of the amplifier passband characteristic about that frequency range.

Thus, as shown by the above, the composite amplifier described hereinabove serves to equalize the signal distribution properties of an overall signal distribution network, equalizing and compensating that system for frequency dependent changes therein. Thus, throughout the signal distribution system, all propagating signals are maintained within prescribed amplitude bounds.

The above described arrangement merely illustrates the principles of the present invention. Numerous modifications and adaptations thereof will be readily apparent to those skilled in the art without departing from the spirit and scope of the present invention.

What is claimed is:

1. In combination in an amplifier exhibiting an amplification gain-frequency characteristic which is electronically variable at differing frequency ranges thereof, said amplifier adapted to operate on an incident signal ensemble which includes pilot signals spaced in frequency, said pilot signals being located in first and second portions of the amplifier gain-frequency passband characteristic, said amplifier comprising gain producing means, first electrically controlled means for varying the amplifier gain-frequency relationship about said first portion of said amplifier pass-band characteristic, second electrically controlled means for varying the amplifier gain-frequency relationship about said second portion of said amplifier passband characteristic, means connected to the output of said gain producing means for determining the amplitude of the first pilot signal at the output of said amplifier, first direct current amplifier means responsive to the output of said first pilot amplitude determining means for supplying a control signal to the control input port of said first amplifier characteristic varying means, additional means connected to the output of said gain producing means for determining the amplitude of said second pilot signal present at the output of said amplifier, and additional direct current amplifier means connected to said additional pilot amplitude determining means for supplying control signal to the input port of said second amplifier characteristic varying means, wherein said gain producing means and said first and second amplifier characteristic varying means comprise a transistor, a first diode, means for supplying a direct current bias to said first diode, means for coupling said diode to said transistor base terminal on a radio frequency current basis, a second diode, means for supplying direct current bias to said second diode, and means including said second diode for providing negative feedback at radio frequency between said transistor collector and base terminals.

* * * * *